(12) United States Patent
Penov et al.

(10) Patent No.: US 10,476,832 B2
(45) Date of Patent: Nov. 12, 2019

(54) CONTENT NOTIFICATION ON ONLINE SOCIAL NETWORKS FOR MEDIA-PLAYER DEVICES

(71) Applicant: Facebook, Inc., Menlo Park, CA (US)

(72) Inventors: Francislav Penov, Kirkland, WA (US); Mateusz Marek Niewczas, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/210,681

(22) Filed: Jul. 14, 2016

(65) Prior Publication Data

US 2018/0019966 A1 Jan. 18, 2018

(51) Int. Cl.
*H04L 12/58* (2006.01)
*H04L 29/08* (2006.01)

(52) U.S. Cl.
CPC ........... *H04L 51/32* (2013.01); *H04L 51/24* (2013.01); *H04L 67/02* (2013.01); *H04L 67/10* (2013.01); *H04L 67/20* (2013.01); *H04L 67/26* (2013.01)

(58) Field of Classification Search
CPC ......... H04L 51/32; H04L 51/24; H04L 67/10; H04L 67/26; H06L 67/02
USPC ....................................................... 709/206
See application file for complete search history.

(56) References Cited

U.S. PATENT DOCUMENTS

| | | | |
|---|---|---|---|
| 2009/0100469 A1* | 4/2009 | Conradt | H04N 7/17318 725/46 |
| 2009/0132527 A1* | 5/2009 | Sheshagiri | G06Q 30/02 |
| 2009/0293079 A1* | 11/2009 | McKee | G06Q 10/105 725/10 |
| 2010/0058395 A1* | 3/2010 | Goergen | H04N 7/17318 725/58 |
| 2010/0058417 A1* | 3/2010 | Rondeau | G06F 17/30017 725/110 |

(Continued)

OTHER PUBLICATIONS

International Search Report and Written Opinion for International Application PCT/US2016/042763, dated Mar. 15, 2017.

(Continued)

*Primary Examiner* — Nicholas R Taylor
*Assistant Examiner* — Chong G Kim
(74) *Attorney, Agent, or Firm* — Baker Botts L.L.P.

(57) ABSTRACT

In one embodiment, a method includes receiving, from a first client system of a first user of the online social network, an indication that a media-player device is proximate to the first client system. Content information associated with media-content items may be accessed. The media-content items may be accessible to the first user via the media-player device. Responsive to the received indication and content information, social-networking information of the first user may be accessed. A media-content item may be selected based on the content information and the social-networking information of the first user. A customized notification may be sent to the first client system. The customized notification may include a reference to the selected media-content item and a deep link to the media-player device. The deep link may be selectable by the first user and may include instructions for accessing the selected media-content item via the media-player device.

31 Claims, 9 Drawing Sheets

(56) References Cited

U.S. PATENT DOCUMENTS

| | | | | |
|---|---|---|---|---|
| 2010/0287033 A1* | 11/2010 | Mathur | | G06F 17/30867 |
| | | | | 705/319 |
| 2011/0107382 A1* | 5/2011 | Morris | | H04N 7/17318 |
| | | | | 725/109 |
| 2011/0126258 A1* | 5/2011 | Emerson | | H04L 51/04 |
| | | | | 725/133 |
| 2011/0153429 A1* | 6/2011 | Ullah | | G06Q 30/02 |
| | | | | 705/14.64 |
| 2011/0296506 A1* | 12/2011 | Caspi | | H04L 12/1822 |
| | | | | 726/6 |
| 2012/0030587 A1* | 2/2012 | Ketkar | | G06F 17/30038 |
| | | | | 715/751 |
| 2012/0036524 A1* | 2/2012 | Mugulavalli | | H04N 21/258 |
| | | | | 725/9 |
| 2012/0174157 A1* | 7/2012 | Stinson, III | | H04N 5/44543 |
| | | | | 725/40 |
| 2012/0179955 A1 | 7/2012 | French | | |
| 2012/0272148 A1* | 10/2012 | Strober | | H04L 65/60 |
| | | | | 715/716 |
| 2012/0324493 A1* | 12/2012 | Holmdahl | | H04H 60/33 |
| | | | | 725/12 |
| 2012/0324494 A1* | 12/2012 | Burger | | H04H 60/33 |
| | | | | 725/12 |
| 2013/0031478 A1* | 1/2013 | Strober | | G06F 9/452 |
| | | | | 715/716 |
| 2013/0110815 A1 | 5/2013 | Tankovich | | |
| 2013/0124759 A1* | 5/2013 | Strober | | H04L 65/60 |
| | | | | 709/248 |
| 2013/0173710 A1* | 7/2013 | Seo | | H04L 67/12 |
| | | | | 709/204 |
| 2013/0291037 A1* | 10/2013 | Im | | H04N 21/4788 |
| | | | | 725/109 |
| 2013/0312049 A1* | 11/2013 | Niyogi | | H04N 21/25883 |
| | | | | 725/110 |
| 2014/0052785 A1* | 2/2014 | Sirpal | | G06F 3/017 |
| | | | | 709/204 |
| 2014/0053190 A1* | 2/2014 | Sirpal | | G06F 3/017 |
| | | | | 725/37 |
| 2014/0059601 A1* | 2/2014 | Sirpal | | G06F 3/017 |
| | | | | 725/37 |
| 2014/0067828 A1* | 3/2014 | Archibong | | H04L 65/4084 |
| | | | | 707/748 |
| 2014/0068466 A1* | 3/2014 | Garcia | | H04L 65/4084 |
| | | | | 715/756 |
| 2014/0068654 A1* | 3/2014 | Marlow | | H04L 65/4084 |
| | | | | 725/28 |
| 2014/0123165 A1* | 5/2014 | Mukherjee | | H04N 21/44222 |
| | | | | 725/14 |
| 2015/0020099 A1* | 1/2015 | Qin | | H04N 21/4667 |
| | | | | 725/37 |
| 2015/0074716 A1* | 3/2015 | Redmann | | G06Q 30/0251 |
| | | | | 725/34 |
| 2015/0156061 A1 | 6/2015 | Saxena | | |
| 2015/0312231 A1 | 10/2015 | White et al. | | |
| 2015/0339274 A1* | 11/2015 | Pappu | | H04N 21/4126 |
| | | | | 715/205 |
| 2016/0034424 A1 | 2/2016 | Won | | |
| 2016/0164982 A1 | 6/2016 | LeBeau | | |

OTHER PUBLICATIONS

U.S. Appl. No. 15/210,718, filed Jul. 14, 2016, Penov.

"Dial Discovery and Launch Protocol Specification Version 2.0", pp. 1-38, retrieved from the Internet: URL:http://www.dial-multiscreen.org/dial-protocol-specification/DIAL-2ndScreenProtocol-2.0.pdf?attredirects=0&d=1 [retrieved on Feb. 16, 2017], May 24, 2016.

Communication received from the EPO, for European Patent Application No. 17150673.6-1958, dated Feb. 27, 2017.

* cited by examiner

700 receive, at an interface of a client system of a user of an online social network, a user input selecting a deep link comprising instructions for accessing a media-content item via a media-player device, wherein the deep link is selected by the user from a notification from the online social network referencing the media-content item, and wherein the media-player device is proximate to the client system ~ 710 send, from the client system to the media-player device in response to the selection of the deep link, instructions for accessing the selected media-content item via the media-player device ~ 720

*FIG. 7*

CONTENT NOTIFICATION ON ONLINE SOCIAL NETWORKS FOR MEDIA-PLAYER DEVICES

TECHNICAL FIELD

This disclosure generally relates to presenting content via a media-player device, particularly within the context of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may provide media-content item recommendations to a user's client system when the user's client system is proximate to a media-device player. The media-content item recommendations may be customized for the user in order to enhance the user's media-viewing experience. The media-player device may have social-networking functionality, and may communicate with a social-networking system. The media-device player may incorporate a display screen or be separately coupled—via a wired or wireless connection—to a display screen (e.g., television). The media-device player may provide streaming media content (e.g., television shows, movies, music, music videos, or any other suitable media content) for display on the display screen. As an example and not by way of limitation, the media-player device may retrieve the media content for streaming, via a wireless internet connection, directly from the content providers.

In particular embodiments, a notification may be delivered to a user's client system, and the notification may include a media-content item recommendation and a deep link. The deep link may be generated by, as an example and not by way of limitation, a social-networking system. When selected (e.g., clicked), the deep link may cause the user's client system to send an instruction to the proximate media-device player instructing it to present the recommended media-content item to the user (e.g., to turn on and play an episode of a television show). The deep link may be presented in an application on the user's client system, and the deep link may cause content to be played on, as an example and not by way of limitation, a TV screen connected to the media-device player.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates an example method for accessing a media-content item via a media-player device using a deep link on a client system.

DESCRIPTION OF EXAMPLE EMBODIMENTS

Figure 1:
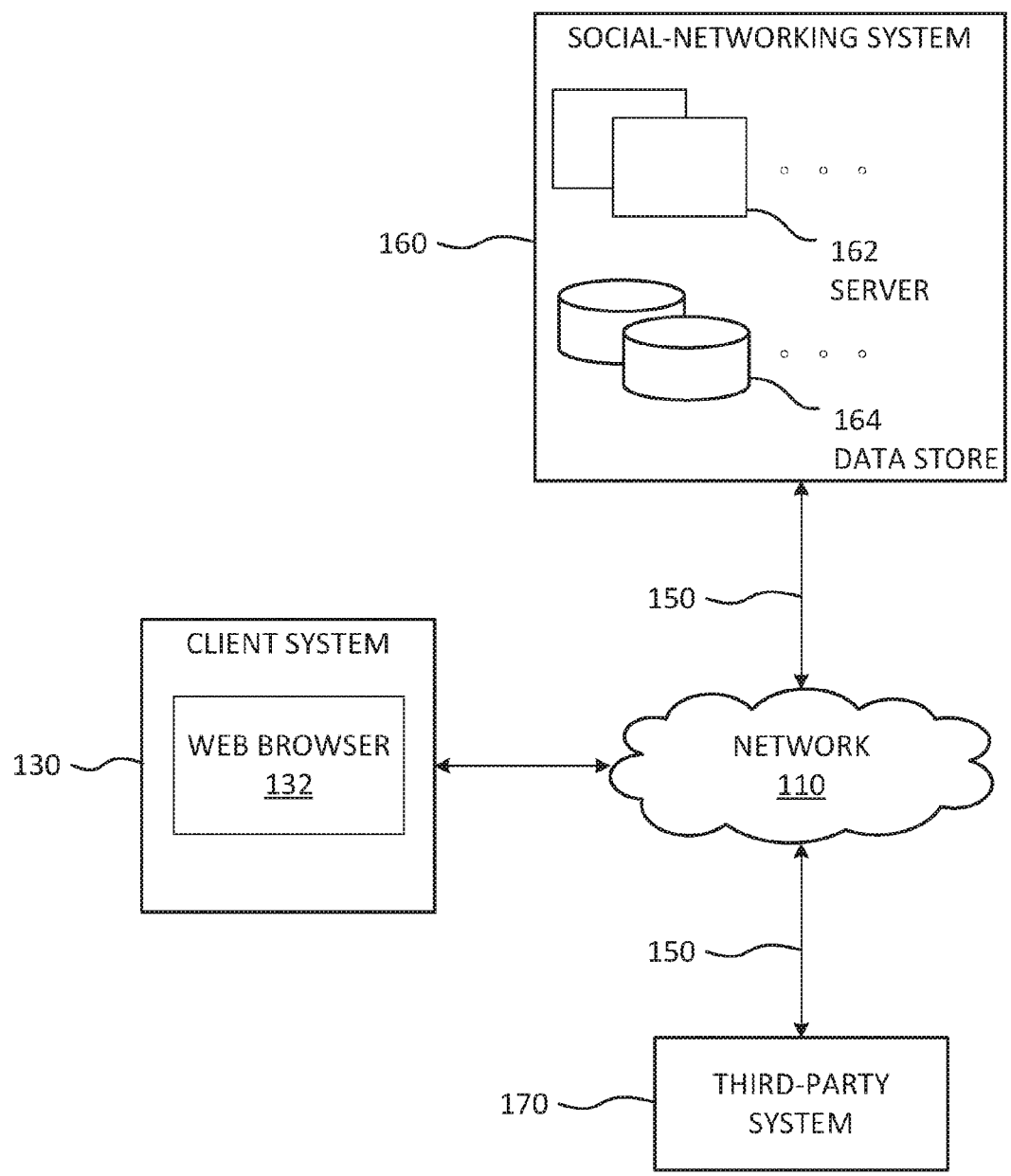
FIG. 1 illustrates an example network environment associated with a social-networking system.

System Overview
FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
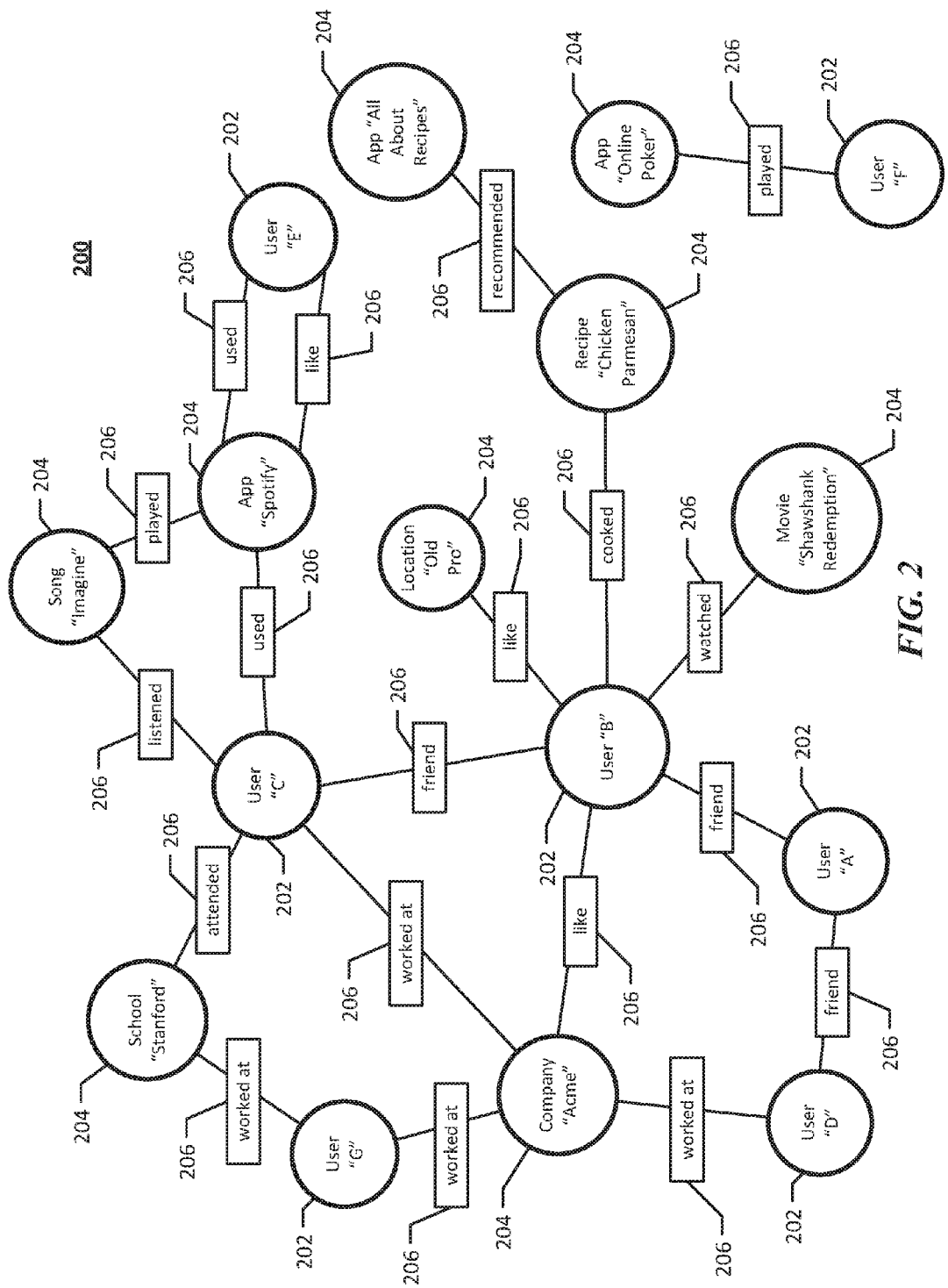
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Customized Notifications and Deep Links

Figure 3:
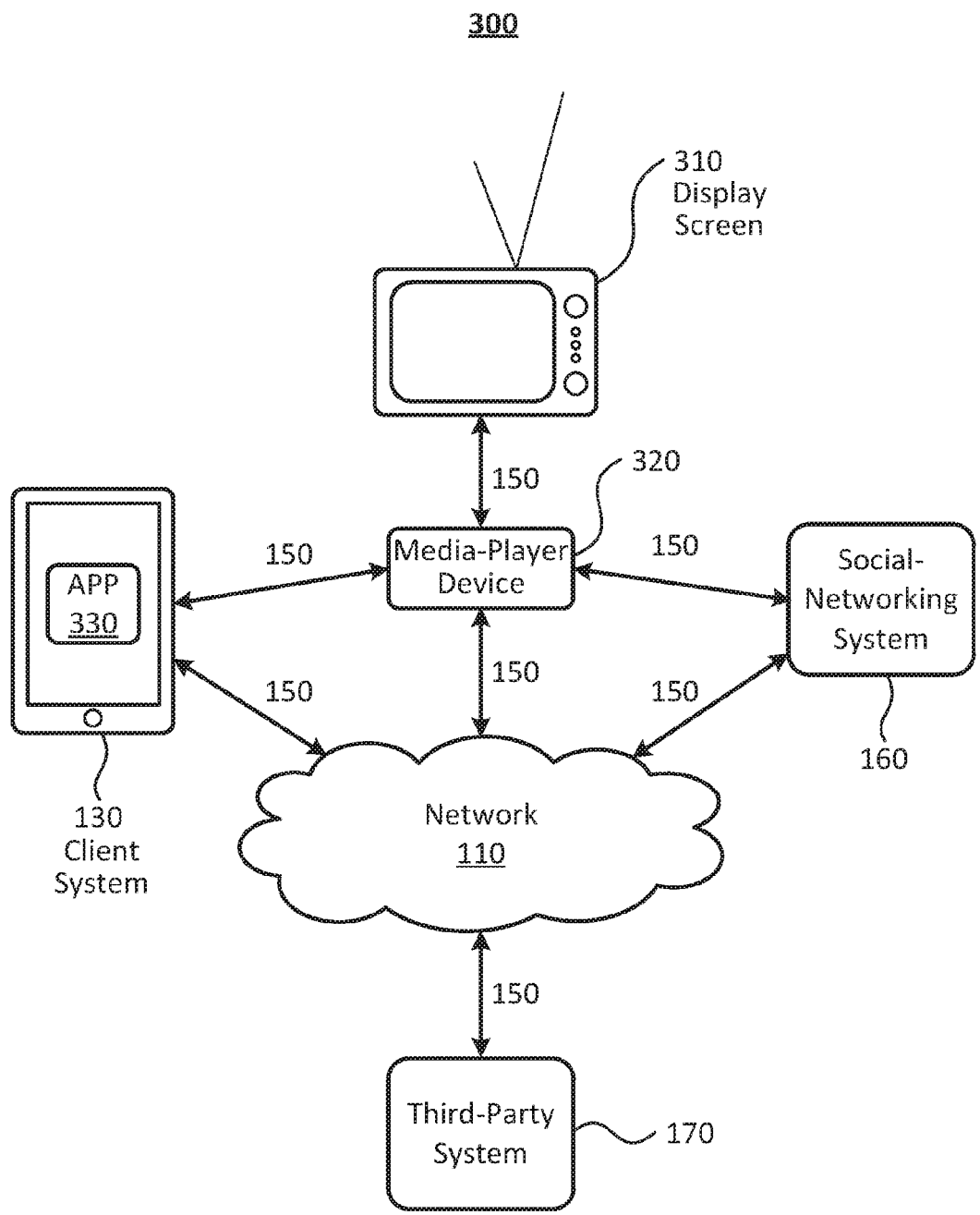
FIG. 3 illustrates an example media-player device environment associated with a social-networking system.

FIG. 3 illustrates an example media-player device environment 300 associated with a social-networking system 160. Media-player device environment 300 includes a media-player device 320, a display screen 310, a client system 130, a social-networking system 160, and a third-party system 170, each connected to a network 110. Media-player device 320 may be communicatively coupled to display screen 310 by a wired or wireless connection. Client system 130 and social-networking system 160 are shown as connected to each other by media-player device 320. Although FIG. 3 illustrates a particular arrangement of media-player device 320, display screen 310, client system 130, social-networking system 160, third-party system 170, and network 110, this disclosure contemplates any suitable arrangement of media-player device 320, display screen 310, client system 130, social-networking system 160, third-party system 170, and network 110. As an example and not by way of limitation, client system 130 and social-networking system 160 may be connected to each other directly, bypassing media-player device 320 and network 110. As another example, media-player device 320 and display screen 310 may be connected to each other via network 110.

Although FIG. 3 illustrates one client system 130, any suitable number of client systems 130 may be authenticated to media-player device 320. As described above, in connection with FIG. 1, links 150 may connect media-player device 320, display screen 310, client system 130, social-networking system 160, and third-party system 170 to network 110 or to each other.

Particular embodiments facilitate deep linking between a user's client system 130 and a media-device player 320 or other suitable systems associated with social-networking system 160. As used herein, a media-player device 320 may be any device suitable for wirelessly communicating with any number of client systems proximate to the media-player device 320. A media-player device 320 may be communicatively-coupled, via a wireless or wired connection, to at least one display screen and able to communicate wirelessly with social-networking system 160. A media-player device 320 may send and receive wireless communications via, for example, radio-frequency identification, near-field communication, ultrasonic waves, BLUETOOTH (e.g., short-range radio frequencies), BLUETOOTH low energy, or any other suitable wireless communication method, particularly short-range wireless communication methods (e.g., less than approximately 300 feet). Media-player devices may be touch-sensitive so as to detect when a user or client system makes contact with the surface of the media-player device and to authenticate a client system 130 to the media-player device in response to the detected touch. Media-player devices may have any of the hardware or software features of the types described in U.S. patent application Ser. No. 14/460,886, titled "Bluetooth Crowd-Sourced Triangulation," filed 15 Aug. 2014; U.S. patent application Ser. No. 14/460,880, titled "Bluetooth Transmission Security Pattern," filed 15 Aug. 2014; and U.S. patent application Ser. No. 14/460,891, titled "Bluetooth Beacon Protocol," filed 15 Aug. 2014; U.S. patent application Ser. No. 13/416,975, titled "Dynamic Processor Duty Cycle Determination Based on Geographic Positioning Signals," filed 9 Mar. 2012; U.S. patent application Ser. No. 13/417,013, titled "Location Tracking for Geographic Positioning Capable Devices," filed 9 Mar. 2012; and U.S. patent application Ser. No. 13/431,842, titled "Dynamic Geographic Beacons for Geographic Positioning Capable Devices," filed 27 Mar. 2012, each of which is incorporated by reference herein. A media-player device may be able to communicate wirelessly with one or more third-party content providers. Third-party system 170 may be a system of a third-party content provider. Third-party content providers may be, for example and not by way of limitation, owners and/or distributors of media content (e.g., music and visual media content). When a user's client system 130 comes into range of a media-player device 320 (e.g., a client system 130 may be in range of a media-player device if it is in range of at least one antenna of the media-player device and can receive a signal from the at least one antenna) or makes contact with the media-player device 320 (e.g., the user taps the media-player device 320 with her client system 130), client system 130 may be authenticated to the media-player device 320 based on wireless communications between client system 130 and the media-player device 320, as described in U.S. patent application Ser. No. 14/836,206, titled "Authenticating Users to Media-Player Devices on Online Social Networks," filed 26 Aug. 2015, which is incorporated by reference herein.

In particular embodiments, the media-player device 320 may have any suitable number of antennas (e.g., directional antennas) for sending and receiving wireless communications. An application on a client system 130 may be used to define a range of each of the antennas based on the strength of signals received from the media-player device 320 antennas at client system 130. A media-player device 320 may have one or more antennas, and each of the antennas may be tuned to define a range of coverage, as described in U.S. patent application Ser. No. 14/836,245, titled "User-Defined Coverage of Media-Player Devices on Online Social Networks," filed 26 Aug. 2015, which is incorporated by reference herein.

In particular embodiments, client system 130 may determine that it is within a threshold distance of (i.e., proximate to) one or more media-player devices 320. In particular embodiments, client system 130 may determine that client system 130 is within a threshold distance of one or more media-player devices 320 if client system 130 is within a wireless range of the one or more media-player devices 320. In particular embodiments, application 330 running on client system 130 may determine that client system 130 is within a threshold distance of one or more media-player devices 320. As an example and not by way of limitation, application 330 may be a native application associated with social-networking system 160, and the user may be logged into the social-networking system 160. As an example and not by way of limitation, application 330 running on client system 130 may determine that client system 130 is connected to a local area network (LAN), that media-player device 320 is also connected the LAN, and may thus determine that client system 130 is proximate to (i.e., within a threshold distance of) media-player device 320. As another example and not by way of limitation, application 330 running on client system 130 may determine that client system 130 is proximate to (i.e., within a threshold distance of) a media-player device 320 using BLUETOOTH. As an example and not by way of limitation, the user may be logged into social-networking system 160 on his client system 160, and social-networking system 160 may determine, via an application associated with social-networking system 160 that is running on client system 130, that the user is proximate to one or more media devices (e.g., using Wi-Fi or BLUETOOTH detection techniques). It will be understood that client system 130 may use any suitable technique for determining that it is within a threshold distance of a media-player device 320, including any other suitable technique for scanning devices or applications connected to the same network as client system 130. Once client system 130 has determined that it is proximate to a media-player device 320, client system 130 may then send an indication to social-networking system 160. The indication may specify that client system 130 is proximate to the media-player device 320. In particular embodiments, application 330 running on client system 130 may send the indication to social-networking system 160. The indication may include information regarding the particular media-player device 320. As an example and not by way of limitation, when client system 130 detects that it is proximate to media-player device 320, client system 130 may detect the serial number, device ID, or other suitable unique identifier of media-player device 320, a type of media-player device 320 (e.g., APPLE TV, SKYSTREAM TV box, or any other suitable indication of the type of media-player device 320), capabilities of media-player device 320 (e.g., High-Definition Multimedia Interface (HDMI) and/or Infrared compatibility), any other suitable information associated with the media-player device 320, or any combination thereof. Client system 130 may then send the media-player device information to social-networking system 160 (e.g., as part of the indication). The media-player device information may allow client system 130, social-networking system 160, or both to determine at least one third-party system 170 (e.g., a third-party content provider) that is associated with the media-player device 320. The particular one or more third-party systems 170 associated with a media-player device 320 may depend on one or more subscriptions of a user (e.g., a media-content subscription with a third-party system 170). As an example and not by way of limitation, a user may have APPLE TV with subscriptions to HBO and SHOWTIME. Third-party systems 170 may be content providers (e.g., APPLE, HBO, and SHOWTIME). In the same example, social-networking system 160 may determine, in response to receiving the indication and the media-player device information that the media-player device 320 is associated with third-party systems 170 that include APPLE, HBO, SHOWTIME, or any combination thereof.

In particular embodiments, social-networking system 160 may access content information associated with one or more media-content items. Media-content items may include, as an example and not by way of limitation, audiovisual content, video content, audio content, images, any other suitable media content, or any combination thereof. Media-content items may be, as an example and not by way of limitation, retrieved by media-player device 320 from one or more third-party systems 170 or from social-networking system 160, or generated or published to social-networking system 160 by one or more users of social-networking system 160. In particular embodiments, social-networking system 160 may access content information associated with one or more media-content items in response to receiving the indication that client system 130 is proximate to one or more media-player devices 320. Content information for a media-content item may include, as an example and not by way of limitation, background information for the media-content item (e.g., summary, genre, setting, rating, reviews, cast information, date of release, and any other suitable background information), a schedule of when the media-content item will be aired, streamed, or otherwise made available to the user, deep link information for accessing the media-content item, any other suitable background information for the respective media-content item. In particular embodiments, social-networking system 160 may access content information only for media-content items that the user has access to (e.g., the user has an active subscription that covers the media-content items). That is, each of the one or more media-content items may be accessible to the user at media-player device 320. In particular embodiments, social-networking system 160 may query one or more third-party systems 170 using identifying information associated with media-player device 320 in order to determine media-content items that are available on that particular media-player device 320 (e.g., television show episodes currently playing, movies available on-demand based on the subscription associated with a device ID of the media-player device 320, or any other suitable media-content items). In particular embodiments, social-networking system 160 may retrieve content information for a media-content item from the third-party system 170 associated with the particular media-content item (e.g., a third-party system 170 that is a third-party content provider for the particular media-content item). As an example and not by way of limitation, social-networking system 160 may send a request to a third-party system 170 for content information for one or more media-content items, and the request may include background information received from media-player device 320 (e.g., media-player device 320 device ID, subscription information, or any other suitable information), social-networking information (e.g., user-subscription information stored in the user's profile, user identification, or any other suitable social-networking information), or both. As an example and not by way of limitation, social-networking system 160 may determine that a user may have active subscriptions with HBO and SHOWTIME (e.g., based on information retrieved from media-player device 320), and social-networking system 160 may retrieve content information for GAME OF THRONES (i.e., a media-content item associated with HBO) and HOMELAND (i.e., a media-content item associated with SHOWTIME) from HBO and SHOWTIME (i.e., third-party systems 170). As another example and not by way of limitation, media-player device 320 may be an APPLE TV device, and social-networking system 160 may retrieve the content information for GAME OF THRONES and HOMELAND from the third-party system 170 associated with APPLE. In particular embodiments, social-networking system 160 may access content information for media-content items that the user does not currently have access to (e.g., the user does not have an active subscription covering the media-content items) but that the user could purchase access to (e.g., as part of a subscription plan or on an item-by-item basis) or access as part of a promotional offer.

In particular embodiments, social-networking system 160 may access social-networking information of the user (i.e., the user associated with the client system 130 that is proximate to one or more media-player devices 320). Social-networking system 160 may access social-networking information of the user in response to the indication received from client system 130 and the accessed content information of the one or more media-content items. Social-networking information of a user may include, as an example and not by way of limitation, demographic information (e.g., age, gender, nationality, race, ethnicity, and locality), biographic information (e.g., name, picture, birthday, and astrological sign), preferences (e.g., music, book, movie, and food preferences), affinity information (e.g., information regarding entities for which the user has expressed affinity), watch-history information (e.g., content watched or otherwise interacted with by the user), advertisement information (e.g., advertisements shown and advertisements conversions), payment credentials, purchase history, loyalty points or credits, social-graph information (e.g., social connections within a threshold degree of separation in social graph 200 and social-networking information of those connections), any other information stored in a profile of the user on social-networking system 160, any other suitable information pertaining to the user, or any combination thereof, subject to privacy preferences of the user or other restrictions imposed by social-networking system 160. As an example and not by way of limitation, social-networking information of a first user may include affinity information for one or more other users who are connected to the first user of client system 130 in social graph 200 by a threshold degree of separation (e.g., first-degree connections may be "friends" of the first user). The affinity information may include, for each user, as an example and not by way of limitation, one or more entities (e.g., people, places, topics, television shows, bands, or any other suitable entities) for which the respective user has expressed affinity (e.g., by "liking" a page associated with the entity on social-networking system 160). As another example and not by way of limitation, social-networking information of the user may include information regarding what one or more other users are currently watching, where the other users are connected to the user of client system 130 in social graph 200 by a threshold degree of separation (e.g., first-degree connections). In particular embodiments, social-networking system 160 may access location information of the client system 130. As an example and not by way of limitation, social-networking system 160 may receive, from client system 130, location information of client system 130. Location information may include, as an example and not by way of limitation, location information determined using GPS functionality or any other suitable geographic-positioning functionality. As another example and not by way of limitation, location information may be determined by social-networking system 160 based on social-networking actions taken by the user (e.g., the user checked-in at a page or event associated with a place at which the media-player is located).

In particular embodiments, social-networking system 160 may select a media-content item from the one or more media-content items for which social-networking system 160 accessed associated content information. As an example and not by way of limitation, the selected media-content item may be a television show episode, a movie, a song, a video clip, any other suitable media content, or any combination thereof. Social-networking system 160 may select the media-content item based on the content information and on the social-networking information of the user. As an example and not by way of limitation, social-networking system 160 may select a media-content item (e.g., a murder-mystery television episode) that it predicts may be of interest to the user based on the content information that includes scheduling information for the media-content item (e.g., the media-content item is a television episode that is about to be broadcast by a third-party system 160 to which the user subscribes) and on social-networking information of the user that includes an indication that the user has expressed or may potentially have an affinity for the subject matter of the television episode (e.g., the user has "liked" pages for other murder-mystery media content and has indicated that she read or "liked" a book on which the television series is based). In particular embodiments, social-networking system 160 may select the media-content item based additionally on location information of the client system 130. Social-networking system 160 may select a particular media-content item for the user based on what other users in the user's location are currently watching or may be interested in watching. As an example and not by way of limitation, social-networking system 160 may select a Warriors basketball game (i.e., media-content item) based on the user's expressed interest in sports (e.g., the user has "liked" a page for sports) and on the user's location information indicating that the user resides in Oakland, Calif. In particular embodiments, social-networking system 160 may select more than one media-content item from the one or more media-content items for which social-networking system 160 accessed associated content information. In particular embodiments, social-networking system 160 may select one or more media-content items as described in U.S. patent application Ser. No. 14/836,300, titled "Customizing Media Content on Online Social Networks," filed 26 Aug. 2015, which is incorporated by reference herein. In particular embodiments, social-networking system 160 may also identify media-content items based on the social-networking information of multiple users. As an example and not by way of limitation, a second user's client system may also be proximate to a media-player device 320, and the user may be logged into social-networking system 160 via an application 330 running on his client system 130. Social-networking system 160 may receive an indication from the second user's client system 130 that it is proximate to the same media-player device 320 that the first user's client system is proximate to. Social-networking system 160 may then select a particular movie (i.e., a media-content item) based on, as an example and not by way of limitation, communications between the users on social-networking system 160 indicating an express interest in viewing the particular movie. In particular embodiments, social-networking system 160 may analyze the social-networking information of one or more users who social-networking system 160 knows are proximate to media-player device 320 (e.g., via indications received from the users' client systems 130) to determine commonalities between the one or more of the users. As an example and not by way of limitation, social-networking system 160 may determine that social-networking information of each of the users indicates that the each has expressed an affinity for a particular television program, and a new episode recently became available for this television program. Social-networking system 160 may then select the new episode of the television program. Social-networking system 160 may select a media-content item based on commonalities in social-networking information of a subset of the audience (i.e., fewer than all of the users present). As another example and not by way of limitation, social-networking information of two out of three users that are proximate to media-player device 320 may indicate that the two users have frequently watched a particular spy drama show, and social-networking system 160 may then select the spy drama show.

In particular embodiments, social-networking system 160 may send a customized notification to the client system, and the customized notification may include a reference to the selected media-content item and a deep link to the media-player device 320 to which the client system 130 is proximate. Social-networking system 160 may generate the deep link specifically for the media-player device 320 that it has determined to be proximate to user client system 130. Social-networking system 160 may generate the deep link based on the background information of the media-player device 320 (e.g., based on the capabilities of the media-player device 320). As an example and not by way of limitation, media-player device 320 may have HDMI capability, and social-networking system 160 may include in the deep link, instructions to power on the media-player device 320, an attached display screen 310, or both, based on the HDMI capability. Social-networking system 160 may generate the deep link based on the content information for the selected media-content item (e.g., based on the time it will be airing and the third-party content provider application or channel on which it will be airing). Social-networking system 160 may send a customized notification with the deep link to client system 130 of the user. The deep link may be presented to the user (i.e., in the customized notification) at an interface of client system 130 as a selectable element (e.g., a "watch now" button). The deep link may include instructions for accessing the selected media-content item via the media-player device 320. When selected (e.g., by user input at an interface of client system 130), the deep link may cause client system 130 to send the instructions to media-player device 320. The instructions may include, as an example and not by way of limitation, an instruction to power on media-player device 320, a connected display screen 310, or both. The instructions may include, as an example and not by way of limitation, an instruction to turn the media-display device 320 to a particular channel or to activate an application running on media-display device 320 and to instruct it to display the selected media-content item. As an example and not by way of limitation, a user may select a "watch now" button in notification regarding a selected media-content item (i.e., a deep link in a customized notification) on the user's client system 130, and the client system 130 may, in response to the selection of the "watch now" button send instructions to a proximate media-player device 320 to power on and load the selected media-content item for display to the viewer at media-player device 320 or a connected display screen 310. In particular embodiments, the deep link may have functionality of the type described in U.S. patent application Ser. No. 14/923,095, titled "Search Indices for Social Plug-ins" filed Oct. 26, 2015; U.S. patent application Ser. No. 14/923,150, titled "Search Indices for Social Plug-ins" filed Oct. 26, 2015; U.S. patent application Ser. No. 14/923,191, titled "Searching for Application Content with Social Plug-ins" filed Oct. 26, 2015; and "U.S. patent application Ser. No. 15/210,718, titled "Deep Linking to Media-Player Devices" filed Jul. 14, 2016, which are incorporated herein by reference.

Although this disclosure describes and illustrates particular embodiments of FIG. 3 as being implemented by social-networking system 160, this disclosure contemplates any suitable embodiments of FIG. 3 occurring on any suitable interface and as being implemented by any suitable platform or system. As an example, and not by way of limitation, particular embodiments of FIG. 3 may be implemented by client system 130, third-party system 170, or media-player device 320. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4A:
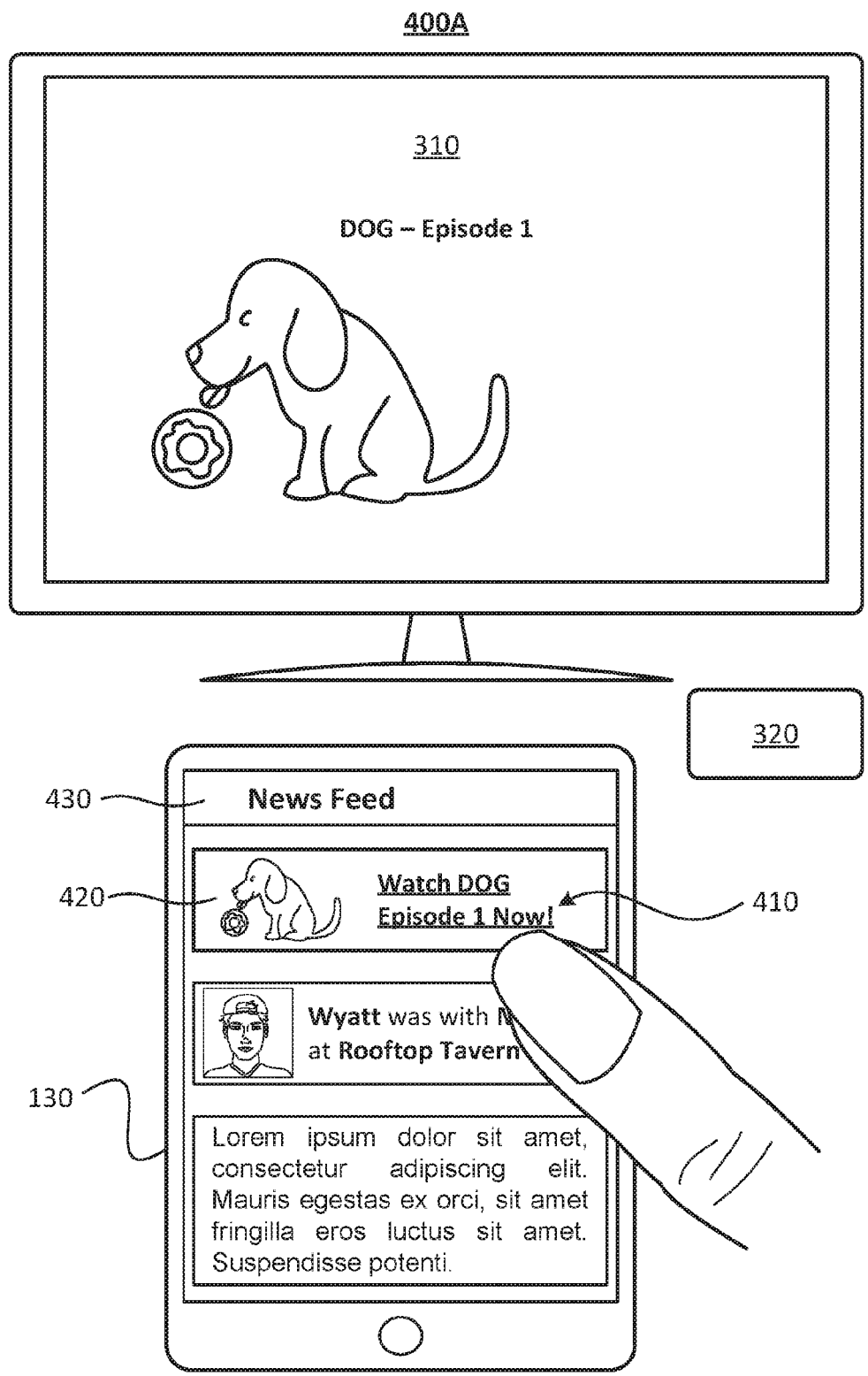
FIG. 4A illustrates an example view of a notification and a deep link on a client system.

FIG. 4A illustrates an example view of a notification 420 and a deep link 410 on a client system 130. In particular embodiments, social-networking system 160 may generate and send a customized notification 420 and deep link 410 to client system 130 for display to a user. In the illustrated example of FIG. 4A, notification 420 is displayed in a feed 430 of an application 330 running on client system 130. Application 330 may be a native application associated with social-networking system 160. In particular embodiments, notification 420 may include a reference to the selected media content item. As an example and not by way of limitation, a notification 420 may include a visual description of the selected media-content item, a textual description of the selected media-content item, or both. In the illustrated example of FIG. 4A, the selected media-content item is episode 1 of a television program called DOG, and notification 420 includes both a visual reference (i.e., an image of a dog eating a donut, which is associated with episode 1) and a textual reference (i.e., the name of the show, DOG, and the particular episode selected are both identified in the text of the deep link 410). In particular embodiments, notification 420 may be an advertisement. Deep link 410 is depicted in FIG. 4A as an interactive element that reads "Watch DOG Episode 1 Now!" The user may interact with (i.e., select) deep link 410 at client system 130. When a selection is received, application 330 may cause client system 130 to send the instructions associated with the deep link 410 to media-player device 320. The instructions may be transmitted using any suitable technique, including, as an example and not by way of limitation, over a Wi-Fi connection if client system 130 and media-player device 320 are connected to the same Wi-Fi network or via BLUETOOTH.

The instructions sent by client system 130 and received by media-player device 320 may be instructions for accessing the selected media-content item via the media-player device 320. In particular embodiments, media-player device 320 may retrieve the selected media-content item (i.e., the selected media-content item associated with the deep link 410) in response to receiving the instructions. As an example and not by way of limitation, media-player device 320 may retrieve the selected media-content item from a third-party system 170 that is the content provider for the selected media-content item. As another example and not by way of limitation, the selected media-content item may be stored locally at media-player device 320, and media-player device 320 may access the locally-stored media-content item in response to receiving the instructions from client system 130. As another example and not by way of limitation, the selected media-content item may be broadcast on a particular channel, and media-player device 320 may tune to the particular channel in order to access the selected media-content item. In particular embodiments, media-player device 320 may present the selected media-content item to the user in response to the instructions received from the client system 130. As an example and not by way of limitation, media-player device 320 may access a selected media-content item and present the media-content item for display on display screen 310. In particular embodiments, media-player device 320 may include a display screen 310 (i.e., integrated into the hardware of the media-player device 320). In particular embodiments, deep link 410 may include instructions for media-player device 320 to access and present the selected media-content item at a particular time. As an example and not by way of limitation, social-networking system 160 may determine, based on content information of the selected media-content item, that the selected media-content item will be aired in 5 minutes. Social-networking system 160 may send the notification 420 to the user's client system 130, and the deep link may read "Watch in 5 minutes." When the user selects the deep link, deep link 410 may cause client system 130 to send the instructions after five minutes have passed or client system 130 may send the instructions to media-player device 320 as soon as the selection is received, and the instructions may cause media-player device 320 to present the selected media-content item to the user after five minutes have passed.

In particular embodiments, a user and his client system 130 may be proximate to (e.g., within a wireless range of or connected to the same Wi-Fi network as) more than one media-player device 320. In this situation, application 330 on client system 130 may determine (e.g., via indications received from each media-player device 320) the proximate media-player devices 320 and may generate a list of proximate media-player devices 320. Application 330 may present the list of proximate media-player devices 320 to the user at client system 130 in response to the user selecting deep link 410. Client system 130 may determine which of the proximate media-player devices 320 is closest to the client system 130 using, as an example and not by way of limitation, BLUETOOTH, and client system 130 may present the closes media-player device 320 to the user as a preferred media-player device 320 (e.g., in the list of proximate media-player devices 320). The user may select the media-player device 320 that he wishes the deep link to connect to (e.g., the user may wish to watch the media-content item in the living room and may select an APPLE TV device located in the living room). Client system 130 may then send the instructions associated with the deep link to the selected media-player device 320.

Figure 4B:
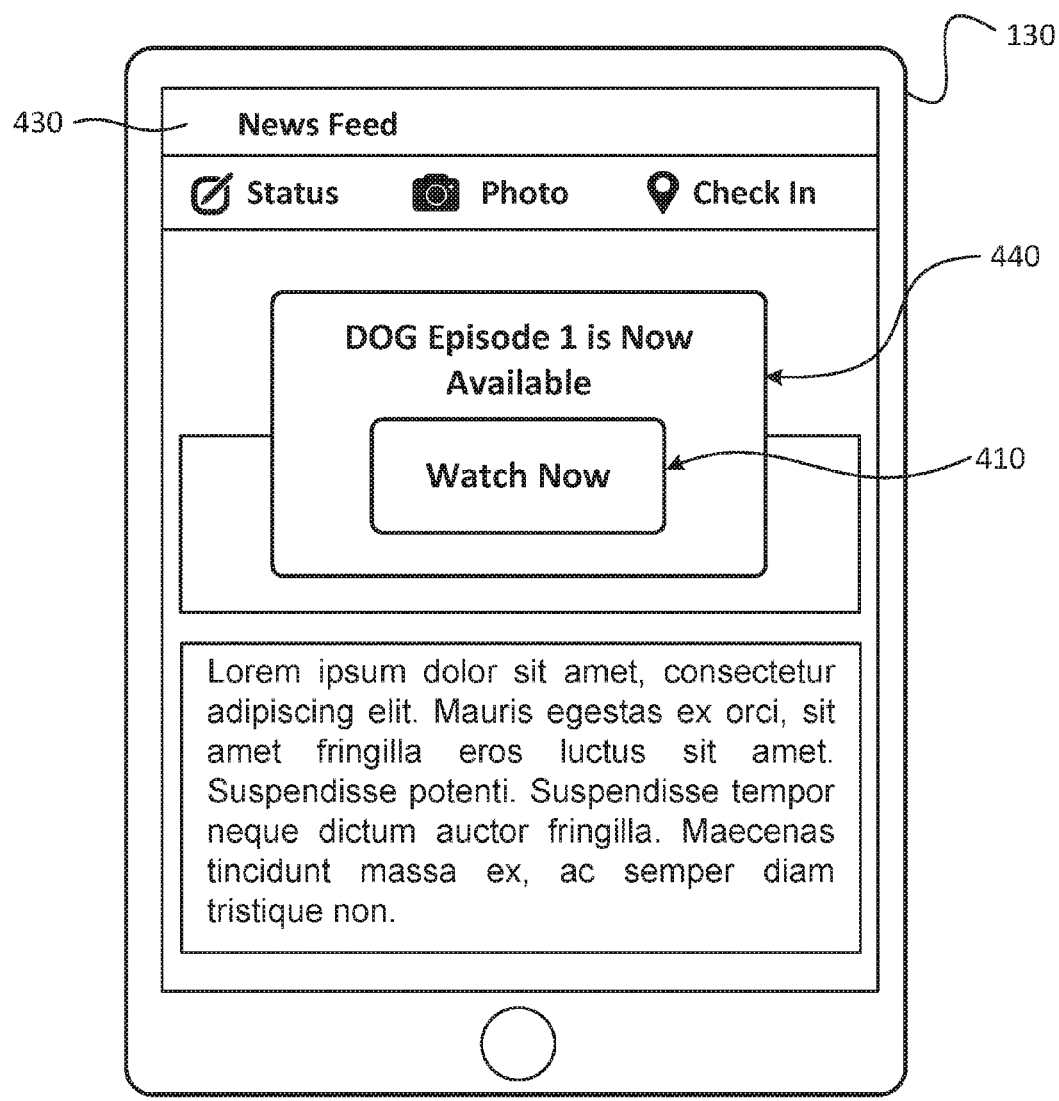
FIG. 4B illustrates an example view of a push notification and a deep link on a client system.

FIG. 4B illustrates an example view of a push notification 440 and deep link 410 on a client system 130. In particular embodiments, social-networking system 160 may generate and send a push notification 440 and deep link 410 to client system 130 for display to a user. In the illustrated example of FIG. 4B, push notification 440 is displayed as overlaying a feed 430 of an application 330 running on client system 130. As an example and not by way of limitation, push notification 440 may be a push notification provided on a lock screen of client system 130 or hovering over any suitable screen of client system 130. As another example and not by way of limitation, prompt 410 may be a type of reaction card, which may be presented to a user in response to a trigger action, of the type described in U.S. patent application Ser. No. 14/466,269, titled "Generating Cards in Response to User Actions on Online Social Networks" filed 22 Aug. 2014, which is incorporated herein by reference. In particular embodiments, a user may specify, in settings, whether or not and how a push notification 440 may be displayed.

Although this disclosure describes and illustrates particular embodiments of FIGS. 4A and 4B as being implemented by social-networking system 160, this disclosure contemplates any suitable embodiments of FIGS. 4A and 4B occurring on any suitable interface and as being implemented by any suitable platform or system. As an example, and not by way of limitation, particular embodiments of FIGS. 4A and 4B may be implemented by client system 130, third-party system 170, or media-player device 320. Furthermore, although this disclosure describes and illustrates particular components, devices, or systems carrying out particular steps of the method of FIGS. 4A and 4B, this disclosure contemplates any suitable combination of any suitable components, devices, or systems carrying out any suitable steps of the method of FIGS. 4A and 4B.

Figure 5:
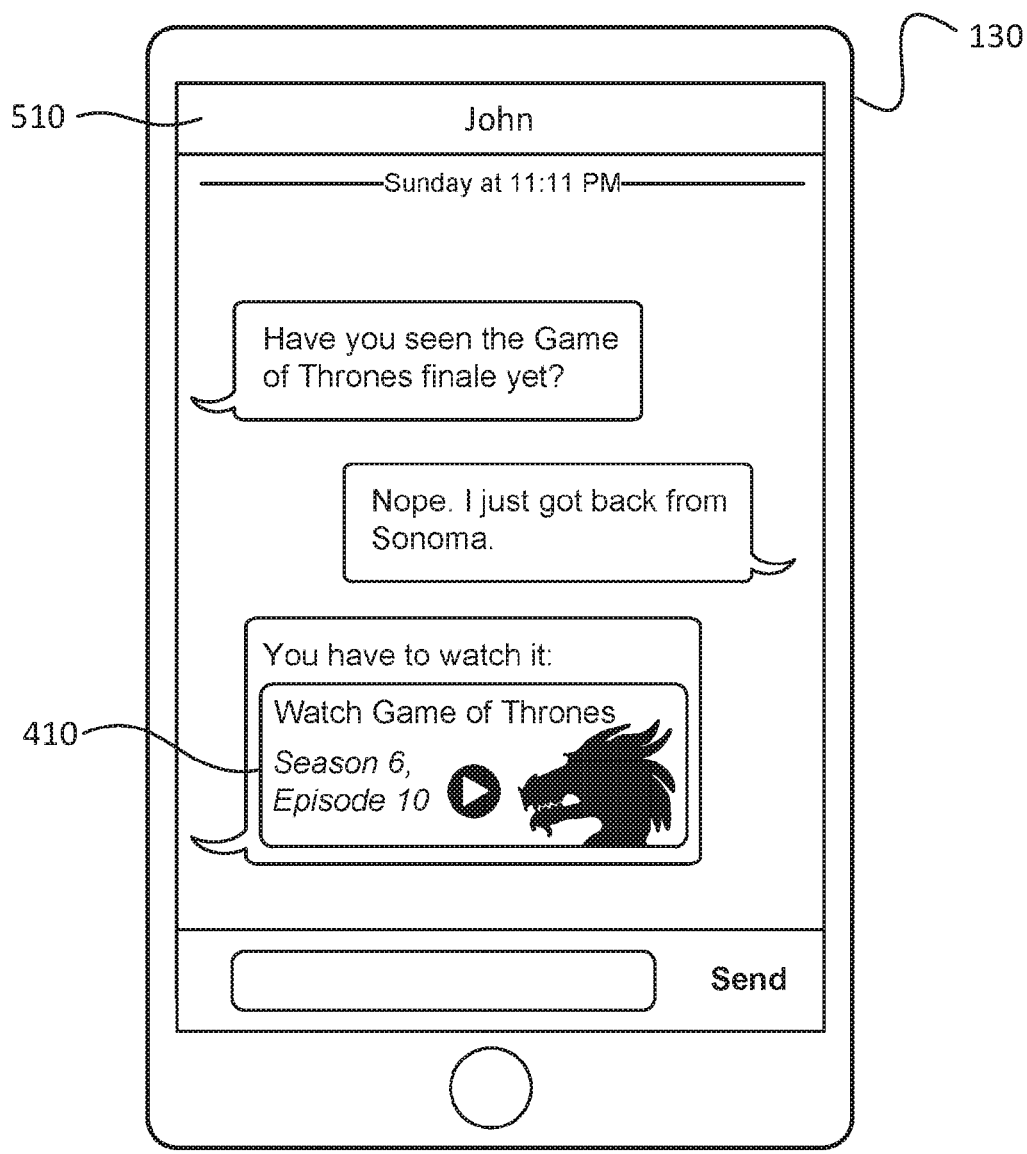
FIG. 5 illustrates an example view of a deep link in a messaging application on a client system.

FIG. 5 illustrates an example view of a deep link 410 in a messaging application 510 on a client system 130. In particular embodiments, a notification and deep link 410 may be sent by a first user one or more second users over a messaging application. In the illustrated example of FIG. 5, two users are having a conversation, and the first user sends a notification to the second user, John, encouraging him to watch GAME OF THRONES, Season 6, Episode 10. In particular embodiments, a user may send a request for a media-content item via client system 130 to social-networking system 160. As an example and not by way of limitation, the user may access a list of available media-content items on his client system 130 or media-player device 320, and the user may select an option for requesting for the entire media-content item or a selected clip of the media-content item. Social-networking system 160 may generate a notification and deep link 410 and send the notification and deep link 410 to the client system 130 in response to the received request. In particular embodiments, the user may then utilize the deep link (i.e., select the deep link 410, which may be sent to a proximate media-player device 320 for presentation of the media-content item to the user). In particular embodiments, the user may send the notification and deep link 410 to one or more other users via, as an example and not by way of limitation, a messaging application 510, email, text message, or any other suitable technique for communicating notification and deep link 410 to one or more other users. A recipient user may then select the deep link 410 in an application 330 on his client system 130. Application 330 may then detect a proximate media-player device 320 to the recipient user's client system and send the deep link 410 instructions to the proximate media-player device 320 for presentation of the media-content item, which was selected by the sending user, to the recipient user. In particular embodiments, the media-player device 320 of the recipient user may only be able to present the shared media-content item if it is accessible to the recipient user (e.g., via an active subscription with the associated third-party system 170). In particular embodiments, media-player device 320 may be able to present the shared media-content item to the user even if it is not normally accessible to the recipient user (e.g., the sending user's subscription plan may permit a predetermined number of deep links 410 to be shared with other users to view the media-content item on a demo basis).

Although this disclosure describes and illustrates particular embodiments of FIG. 5 as being implemented by social-networking system 160, this disclosure contemplates any suitable embodiments of FIG. 5 occurring on any suitable interface and as being implemented by any suitable platform or system. As an example, and not by way of limitation, particular embodiments of FIG. 5 may be implemented by client system 130, third-party system 170, or media-player device 320. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
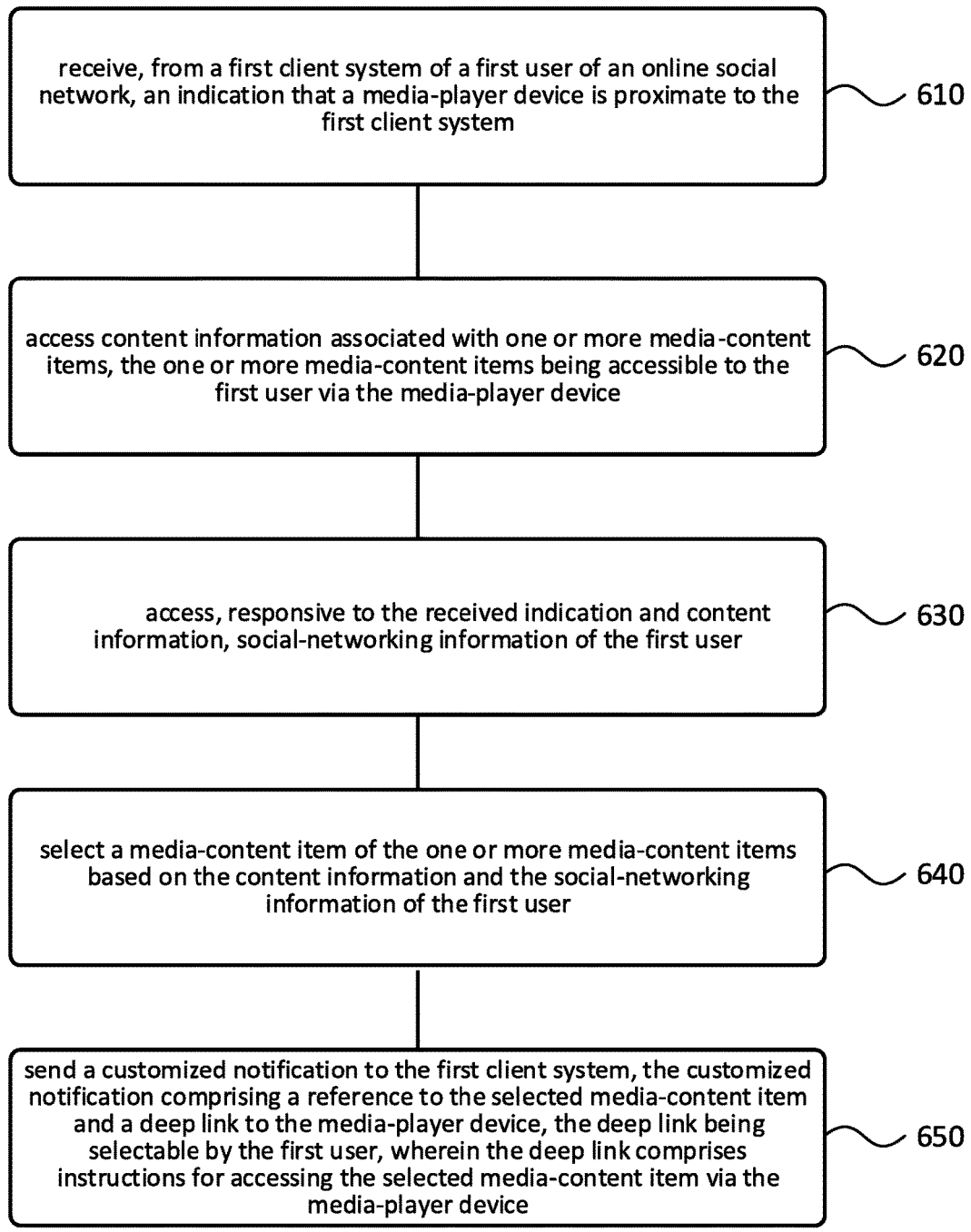
FIG. 6 illustrates an example method for sending customized notifications to a client system.

FIG. 6 illustrates an example method for sending customized notifications to a client system 130. The method may begin at step 610, where social-networking system 160 may receive, from a first client system 130 of a first user of an online social network, an indication that a media-player device 320 is proximate to the first client system 130. At step 620, social-networking system 160 may access content information associated with one or more media-content items. The one or more media-content items may be accessible to the first user via the media-player device 320. At step 630, social-networking system 160 may access, responsive to the received indication and content information, social-networking information of the first user. At step 640, social-networking system 160 may select a media-content item of the one or more media-content items based on the content information and the social-networking information of the first user. At step 650, social-networking system 160 may send a customized notification to the first client system 130. The customized notification may include a reference to the selected media-content item and a deep link to the media-player device 320. The deep link may be selectable by the first user, and the deep link may include instructions for accessing the selected media-content item via the media-player device 320.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for sending customized notifications to a client system 130 including the particular steps of the method of FIG. 6, this disclosure contemplates any suitable method for sending customized notifications to a client system 130 including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6. As an example and not by way of limitation, the particular steps of the method of FIG. 6 may be performed by client system 130, third-party system 170, or media-player device 320.

FIG. 7 illustrates an example method for accessing a media-content item via media-player device 320 using a deep link on a client system 130. The method may begin at step 710, where a client system 130 of a user of an online social network may receive, at an interface of the client system 130, a user input selecting a deep link. The deep link may include instructions for accessing a media-content item via a media-player device 320. The deep link may be selected by the user from a notification from the online social network referencing the media-content item. The media-player device 320 may be proximate to the client system 130. At step 720, the client system 130 may send, to the media-player device 320, in response to the selection of the deep link, instructions for accessing the selected media-content item via the media-player device 320.

Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for accessing a media-content item via media-player device 320 using a deep link on a client system 130 including the particular steps of the method of FIG. 7, this disclosure contemplates any suitable method for accessing a media-content item via media-player device 320 using a deep link on a client system 130 including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7. As an example and not by way of limitation, the particular steps of the method of FIG. 7 may be performed by social-networking system 160, third-party system 170, or media-player device 320.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the first querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
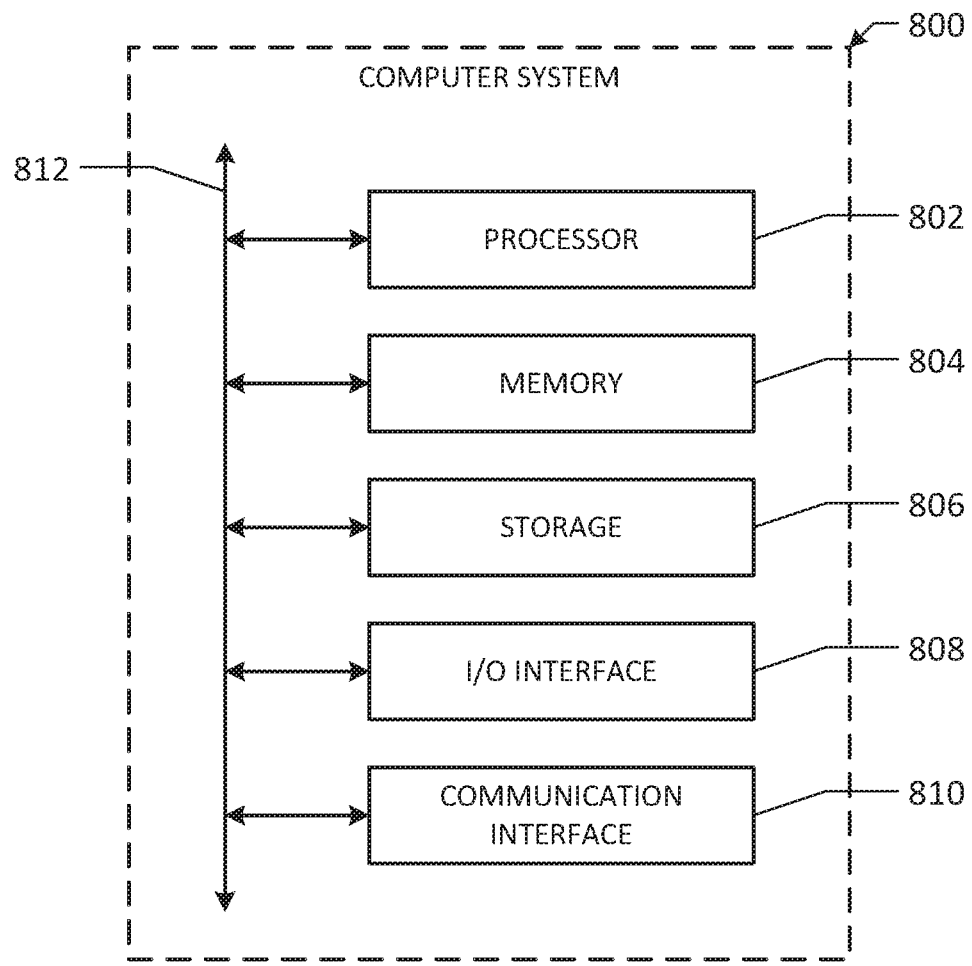
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:
   receiving, by the one or more computing devices from a first client system of a first user of the online social network, an indication that the first client system has determined a media-player device is within a threshold distance to the first client system, wherein the indication comprises information of the media-player device;
   determining, by the one or more computing devices, one or more media-content items that are available on the particular media-player device based on the information of the media-player device;
   accessing, by the one or more computing devices, content information associated with the one or more media-content items, the one or more media-content items being accessible to the first user via the media-player device, wherein the content information indicates one or more attributes of the respective media-content item;
   accessing, by the one or more computing devices, responsive to the received indication that the first client system has determined the media-player device is within the threshold distance to the first client system, social-networking information of the first user;
   selecting, by the one or more computing devices, a media-content item of the one or more media-content items based on the content information of the media-content item and the social-networking information of the first user; and
   sending, by the one or more computing devices, a customized notification to the first client system, the customized notification comprising a reference to the selected media-content item and a deep link to the media-player device, the deep link being selectable by the first user, wherein the deep link comprises instructions for presenting the selected media-content item on a display device coupled to the media-player device.

2. The method of claim 1, wherein the media-device player retrieves the selected media-content item in response to the instructions sent by the first client system in response to the first user selecting the deep link.

3. The method of claim 2, wherein the media-device player presents the selected media-content item to the user in response to the instructions received from the first client system.

4. The method of claim 1, wherein the content information is accessed from the media-player device.

5. The method of claim 1, wherein the content information is accessed from a third-party content provider, the third-party content provider being associated with at least one of the one or more media-content items.

6. The method of claim 1, wherein at least one of the one or more media-content items is accessible to the first user via the media-player device based on the user having a subscription with a third-party content provider.

7. The method of claim 1, wherein the reference to the selected media-content item comprises an advertisement for the selected media-content item.

8. The method of claim 1, wherein the media-player device is within the threshold distance to the first client system if it is within a wireless range of the first client system.

9. The method of claim 1, further comprising:
   receiving, from a second client system of a second user of the online social network, an indication that the media-player device is within the threshold distance to the second client system; and
   accessing, responsive to the received indication that the media-player device is within the threshold distance to the second client system and the content information, social-networking information of the second user,
   wherein the selecting of the media-content item is further based on the social-networking information of the second user.

10. The method of claim 1, wherein the social-networking information of the first user comprises preference information of the first user.

11. The method of claim 1, wherein the social-networking information of the first user comprises demographic information of the first user.

12. The method of claim 1, wherein the online social network comprises a social graph comprising a plurality of nodes and a plurality of edges connecting the nodes, each of the edges between two of the nodes representing a single degree of separation between them, the nodes comprising:
   a first node corresponding to the first user of the online social network; and
   a plurality of second nodes that each correspond to a respective concept associated with the online social network.

13. The method of claim 1, wherein the social-networking information of the first user comprises an affinity coefficient of the first node with respect to one or more second nodes.

14. The method of claim 1, wherein the content information associated with the one or more media-content items comprises schedule information for each of the media-content items.

15. The method of claim 1, wherein the content information associated with the one or more media-content items comprises genre information for each of the media-content items.

16. One or more computer-readable non-transitory storage media embodying software that is operable when executed to:
   receive, by one or more computing devices of an online social network from a first client system of a first user of the online social network, an indication that the first client system has determined a media-player device is within a threshold distance to the first client system, wherein the indication comprises information of the media-player device;
   determine, by the one or more computing devices, one or more media-content items that are available on the particular media-player device based on the information of the media-player device;
   access, by the one or more computing devices, content information associated with the one or more media-content items, the one or more media-content items being accessible to the first user via the media-player device, wherein the content information indicates one or more attributes of the respective media-content item;
   access, by the one or more computing devices, responsive to the received indication that the first client system has determined the media-player device is within the threshold distance to the first client system, social-networking information of the first user;
   select, by the one or more computing devices, a media-content item of the one or more media-content items based on the content information of the media-content item and the social-networking information of the first user; and
   send, by the one or more computing devices, a customized notification to the first client system, the customized notification comprising a reference to the selected media-content item and a deep link to the media-player device, the deep link being selectable by the first user, wherein the deep link comprises instructions for presenting the selected media-content item on a display device coupled to the media-player device.

17. A system comprising: one or more processors; and a memory coupled to the processors comprising instructions executable by the processors, the processors operable when executing the instructions to:
   receive, by one or more computing devices of an online social network from a first client system of a first user of the online social network, an indication that the first client system has determined a media-player device is within a threshold distance to the first client system, wherein the indication comprises information of the media-player device;
   determine, by the one or more computing devices, one or more media-content items that are available on the particular media-player device based on the information of the media-player device;
   access, by the one or more computing devices, content information associated with the one or more media-content items, the one or more media-content items being accessible to the first user via the media-player device, wherein the content information indicates one or more attributes of the respective media-content item;
   access, by the one or more computing devices, responsive to the received indication that the first client system has determined the media-player device is within the threshold distance to the first client system, social-networking information of the first user;
   select, by the one or more computing devices, a media-content item of the one or more media-content items based on the content information of the media-content item and the social-networking information of the first user; and
   send, by the one or more computing devices, a customized notification to the first client system, the customized notification comprising a reference to the selected media-content item and a deep link to the media-player device, the deep link being selectable by the first user, wherein the deep link comprises instructions for presenting the selected media-content item on a display device coupled to the media-player device.

18. The system of claim 17, wherein the media-device player is further to retrieve the selected media-content item in response to the instructions sent by the first client system in response a selection of the deep link by the first user.

19. The system of claim 18, wherein the media-device player is further to present the selected media-content item to the user in response to the instructions received from the first client system.

20. The system of claim 17, wherein the content information is accessed from the media-player device.

21. The system of claim 17, wherein the content information is accessed from a third-party content provider, the third-party content provider being associated with at least one of the one or more media-content items.

22. The system of claim 17, wherein at least one of the one or more media-content items is accessible to the first user via the media-player device based on the user having a subscription with a third-party content provider.

23. The system of claim 17, wherein the reference to the selected media-content item comprises an advertisement for the selected media-content item.

24. The system of claim 17, wherein the media-player device is within the threshold distance to the first client system if it is within a wireless range of the first client system.

25. The system of claim 17, wherein the processors are further operable when executing instructions to:
   receive, from a second client system of a second user of the online social network, an indication that the media-player device is within the threshold distance to the second client system; and
   access, responsive to the received indication that the media-player device is within the threshold distance to the second client system and the content information, social-networking information of the second user, and wherein the selection of the media-content item is further based on the social-networking information of the second user.

26. The system of claim 17, wherein the social-networking information of the first user comprises preference information of the first user.

27. The system of claim 17, wherein the social-networking information of the first user comprises demographic information of the first user.

28. The system of claim 17, wherein the online social network comprises a social graph comprising a plurality of nodes and a plurality of edges connecting the nodes, each of the edges between two of the nodes representing a single degree of separation between them, the nodes comprising:

a first node corresponding to the first user of the online social network; and a plurality of second nodes that each correspond to a respective concept associated with the online social network.

29. The system of claim 17, wherein the social-networking information of the first user comprises an affinity coefficient of the first node with respect to one or more second nodes.

30. The system of claim 17, wherein the content information associated with the one or more media-content items comprises schedule information for each of the media-content items.

31. The system of claim 17, wherein the content information associated with the one or more media-content items comprises genre information for each of the media-content items.

* * * * *